United States Patent Office 3,705,915
Patented Dec. 12, 1972

3,705,915
3-METHYL-17α-ETHYNYL-19-NOR-3,5-ANDROSTADIENE-17β-OL
Klaus Irmscher and Klaus Bruckner, Darmstadt, Germany, assignors to E. Merck A.G., Darmstadt, Germany
No Drawing. Continuation of abandoned application Ser. No. 744,683, July 15, 1968. This application Nov. 24, 1970, Ser. No. 92,175
Claims priority, application Germany, July 15, 1967, M 74,767
Int. Cl. C07c *169/20*
U.S. Cl. 260—397.5     1 Claim

ABSTRACT OF THE DISCLOSURE

The following compounds function as ovulation-inhibitors in rats but exhibit substantially no progestational activity in the Clauberg test on rabbits:

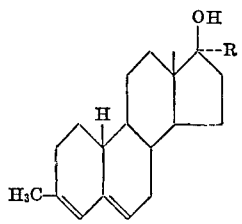

wherein

R represents allyl or ethynyl.

---

This application is a continuation of application Ser. No. 744,683, filed July 15, 1968, now abandoned.

This invention relates to 17α-substituted 3-methyl-19-nor-3,5-androstadiene-17β-ols.

An object of one aspect of this invention, therefore, is to provide novel chemical compounds and processes for producing same.

An object of another aspect of the invention is to provide pharmaceutical compositions based on these compounds.

To attain the above objects, there are provided compounds of the formula:

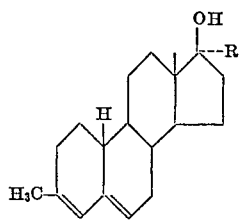

wherein

R represents allyl or ethynyl.

These compounds inhibit substantially the same degree of ovulation-inhibiting properties in rats as 17α-ethynyl-19-nor testosterone, but in contradistinction to the latter substance, unexpectedly exhibit substantially no progestational activity in the Clauberg test on rabbits. In addition, antifertility, estrogenic and antiestrogenic effects have been observed by standard pharmacological tests with these compounds on rats and mice.

To produce these compounds, a corresponding 3-methylene-19-nor-4-androstene-17β-ol derivative of the general formula:

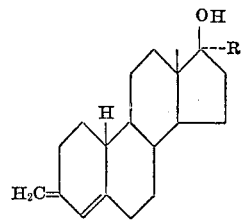

wherein

R has the above-indicated meanings, is treated with an isomerization agent.

Acids are particularly advantageous as the isomerization agent. Examples of suitable acids include, but are not limited to, mineral acids, such as hydrochloric acid, sulfuric acid, perchloric acid; strong organic acids, such as oxalic acid, p-toluenesulfonic acid; complexes of organic acids with inorganic salts, such as boron trifluoride or zinc chloride; and also acidic ion exchange resins; and adsorbents, such as acidic aluminum oxide, acidic silicates or acidic silica gel.

The isomerization is facilitated by the presence of an inert solvent, such as, for example, an alcohol of up to 6 carbon atoms, which alcohol can be anhydrous or aqueous. Other suitable solvents include, but are not limited to, ketones, such as acetone; ethers, such as tetrahydrofuran, dioxane, diisopropyl ether, diethyl ether; dimethylformamide and dimethyl sulfoxide; and mixtures thereof with water. Instead of such solvents, it is also possible to operate in an excess of the isomerization agent.

In any case, the isomerization reaction temperature range is about between 0° C. and the boiling point of the solvent employed, particularly between room temperature and 100° C. The isomerization is normally terminated after 0.5 to 6 hours, the progress of the isomerization reaction being observable by means of thin-layer chromatography or UV spectroscopy.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, Vaseline, cholesterol, etc.

For parenteral application, particularly suitable are solutions, preferably oily or aqueous solutions, as well as suspensions, emulsions or implants. Ampoules are convenient unit dosages.

For enteral application, particularly suitable are tablets or dragées which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The novel compounds are administered to mammals, preferably in a unit dosage of 0.1–10 mg., particularly 0.5–2 mg. and 1–5000 mg. of pharmaceutically acceptable carrier. The dosage range is generally 0.001 to 0.5 mg. per kg. of body weight per day, the dosage being generally administered in a single daily dose, but it can also be alternatively administered in divided doses.

As a pharmacological guide, the compounds of this invention can be used in a similar manner as the known 17α-ethynyl-nor-testosterone for ovulation-inhibiting effects.

The ovulation-inhibiting effect of the compounds can be determined by the method of Suchowsky et al., Arzneimittelforschung, volume 15, page 437 (1965); the compounds are applied orally on rats.

The progestational effect of the compounds can be determined by the method of Clauberg as described in modified form by McPhail, Journal of Physiology, volume 83, page 145 (1935); the compounds are applied orally or subcutaneously on rabbits.

The anti-fertility effect of the compounds can be determined by the method of Emmens and Martin, Journal of Reproduction and Fertility, volume 9, page 269 (1965); the compounds are applied orally on rats.

The estrogenic effect of the compounds can be determined by the method of Allen and Doisy, Journal of the American Medical Association, volume 81, page 819 (1923); the compounds are applied orally on rats.

The anti-estrogenic effect of the compounds can be determined by the method of Dorfman, Kincl and Ringold, Endocrinology, volume 68, page 17 (1961); the compounds are applied orally on mice.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

1.8 g. of 3-methylene-17α-ethynyl-19-nor-4-androstene-17β-ol is dissolved in 96 ml. of ethanol and mixed with 3 ml. of concentrated hydrochloric acid. The reaction mixture is allowed to stand overnight, is then stirred into 800 ml. of water, and the thus-produced 3-methyl-17α-ethynyl-19-nor-3,5-androstadiene-17β-ol is filtered off, washed with water, dried, and recrystallized from acetone, M.P. 196–199° C. (sintering at 190° C.); $[\alpha]_D^{24}$ —290° (in chloroform).

In place of the ethanol, it is also possible to employ with similar success methanol, isopropanol, propanol, butanol, isobutanol, pentanol or isopentanol.

The starting material 3-methylene-17α-ethynyl-19-nor-androstene-17β-ol is obtained as follows:

5.02 g. of methyltriphenyl phosphonium bromide is suspended in 70 ml. of absolute ether. With agitation and introduction of nitrogen, 11.6 ml. of a solution of lithium phenyl in ether (1.3 N) is added. Under a nitrogen atmosphere, the reaction mixture is stirred for 2 hours at room temperature and 1.1 g. of 17α-ethynyl-19-nor-testosterone in 120 ml. of absolute tetrahydrofuran is then added. The contents of the flask are agitated for 4 hours at room temperature under a nitrogen atmosphere, and then allowed to stand overnight. Thereafter, the ether is distilled off and replaced by absolute tetrahydrofuran; the mixture is boiled for another 6 hours under a nitrogen atmosphere, diluted with water after cooling and then extracted with ether. The ether solution is washed with water, dried with sodium sulfate, filtered, and finally the ether is distilled off.

The thus-obtained oil is chromatographed on 30 g. of alkaline aluminum oxide, activity stage II, with benzene. From the forward fractions, there is crystallized from 70% methanol 0.7 g. of 3-methylene-17α-ethynyl-19-nor-4-androstene-17β-ol, M.P. 107–110° C.; $[\alpha]_D^{24}$ +49° (chloroform).

EXAMPLE 2

Following the technique of Example 1, 3-methylene-17α-allyl-19-nor-4-androstene-17β-ol, M.P. 71–73° C.; $[\alpha]_D^{24}$ +86° (chloroform) obtained by reacting 17α-allyl-19-nor testosterone with triphenylphosphine methylene analogously to Example 1 is converted to 3-methyl-17α-allyl-19-nor-3,5-androstadiene-17β-ol, M.P. 92–96° C. (from methanol); $[\alpha]_D^{24}$ —186° (chloroform).

The following examples include pharmaceutical compositions of the novel compounds:

Example A.—Tablets

Each tablet contains

| | Mg. |
|---|---|
| 3-methyl-17α-ethynyl-19-nor-3,5-androstadiene-17β-ol | 2 |
| Lactose | 60 |
| Wheat starch | 35 |
| Magnesium stearate | 2 |

Example B.—Tablets

Each tablet contains

| | Mg. |
|---|---|
| 3-methyl-17α-ethynyl-19-nor-3,5-androstadiene-17β-ol | 0.5 |
| Ethynyl estradiol | 0.1 |
| Lactose | 75 |
| Potato starch | 23 |
| Magnesium stearate | 1.4 |

Example C.—Coated tablets

Each tablet contains

| | Mg. |
|---|---|
| 3-methyl-17α-allyl-19-nor-3,5-androstadiene-17β-ol | 0.1 |
| Lactose | 80 |
| Corn starch | 15 |
| Talc | 2 |

The coating (150 mg.) is a conventional mixture of corn starch, sugar, talc, and tragacanth.

Example D.—Solution for injection

A solution of 200 g. of 3-methyl-17α-ethynyl-19-nor-3,5-androstadiene-17β-ol in 99.8 kg. of sesame oil is prepared and filled into ampoules in such a manner that each ampoule contains 2 mg. of the drug.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claim.

We claim:

1. 3-methyl-17α-ethynyl-19-nor-3,5-androstadiene-17β-ol.

References Cited

Mori—Chem & Pharm. Bull., vol. 10 (1962), pp. 382–386.

Irmscher et al.—J. Med. Chem., May 1964, pp. 345–347.

Goldkamp et al.—J. Med. Chem., June 1965, pp. 409–411.

HENRY A. FRENCH, Primary Examiner

U.S. Cl. X.R.

424—238